US012002324B2

(12) United States Patent
Essex

(10) Patent No.: US 12,002,324 B2
(45) Date of Patent: Jun. 4, 2024

(54) ELECTRONIC GAMING CABINET WITH REMOVABLE, PROTECTIVE AND INFORMATIONAL EXTERNAL SURFACE LAYERING

(71) Applicant: Aristocrat Technologies, Inc. (ATI), Las Vegas, NV (US)

(72) Inventor: Bruce Essex, Las Vegas, NV (US)

(73) Assignee: Aristocrat Technologies, Inc. (ATI), Las Vegas, NV (US)

( * ) Notice: Subject to any disclaimer, the term of this patent is extended or adjusted under 35 U.S.C. 154(b) by 0 days.

(21) Appl. No.: 17/388,586

(22) Filed: Jul. 29, 2021

(65) Prior Publication Data

US 2022/0130204 A1 Apr. 28, 2022

Related U.S. Application Data

(60) Provisional application No. 63/106,702, filed on Oct. 28, 2020.

(51) Int. Cl.
*G07F 17/32* (2006.01)

(52) U.S. Cl.
CPC .................................. *G07F 17/3216* (2013.01)

(58) Field of Classification Search
CPC .................................................... G07F 17/3216
See application file for complete search history.

(56) References Cited

U.S. PATENT DOCUMENTS 10,373,205 B2 8/2019 Flack
2006/0189387 A1* 8/2006 Rigsby .................... G07F 17/32 463/37
2007/0130812 A1 6/2007 Popowich
2010/0160016 A1* 6/2010 Shimabukuro ......... G06F 3/016 463/16
2010/0275481 A1 11/2010 Oriel
2011/0236577 A1* 9/2011 Law ......................... B41M 3/06 427/256
2013/0280463 A1* 10/2013 On ............................ B32B 3/10 428/38
2015/0128330 A1 5/2015 Mumme
2020/0020467 A1* 1/2020 Rentrop ................... H01C 1/01

FOREIGN PATENT DOCUMENTS

AU 2016101451 A4 9/2016
WO WO2017/0189387 * 7/2017 ............. G06F 3/023

* cited by examiner

*Primary Examiner* — David L Lewis
*Assistant Examiner* — Robert E Mosser
(74) *Attorney, Agent, or Firm* — McAndrews, Held & Malloy, Ltd.

(57) ABSTRACT

A removable cover for an electronic gaming machine having one or more external surfaces is provided. The removable cover includes a printable film for positioning over the external surfaces of the electronic gaming machine, and a flexible multi-layer film covering the printable film. The multi-layer film includes an adhesive layer arranged to secure the flexible multi-layer film and printable film to the external surface of the electronic gaming machine. The removable cover is shaped to correspond with a shape of at least a portion of the external surface of the electronic gaming machine. The printable film is configured to be imprinted with one or more of graphics, patterns, colors, text, or a combination thereof.

23 Claims, 7 Drawing Sheets

ELECTRONIC GAMING CABINET WITH REMOVABLE, PROTECTIVE AND INFORMATIONAL EXTERNAL SURFACE LAYERING

RELATED APPLICATION(S)

The present application claims priority to U.S. Provisional Patent Application No. 63/106,702, filed Oct. 28, 2020, and entitled "Electronic Gaming Cabinet with Removable, Protective and Informational External Covering" which is hereby incorporated by reference in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

Systems and methods for a removable cover for an electronic gaming machine are disclosed. In particular, the electronic gaming machine may have multiple external surfaces, each defined by a shape or size. The removable cover is shaped to correspond with the shape or size the external surfaces to provide graphics, patterns, colors, text, or a combination thereof. For example, the removable cover may be a multi-layer film for positioning over the external surfaces of the electronic gaming machine, which may include a printable film, and a flexible multi-layer film covering the printable film to provide additional protection for the printed layer and/or material. The multi-layer film is arranged to secure the flexible multi-layer film and the printable film to the external surface of the electronic gaming machine, such as by use of an adhesive layer. The removable cover may be replaced, overlaid, and/or discarded to replace the material presented to a viewer of the removable cover and associated electronic gaming machine.

DETAILED DESCRIPTION

Figure 1:
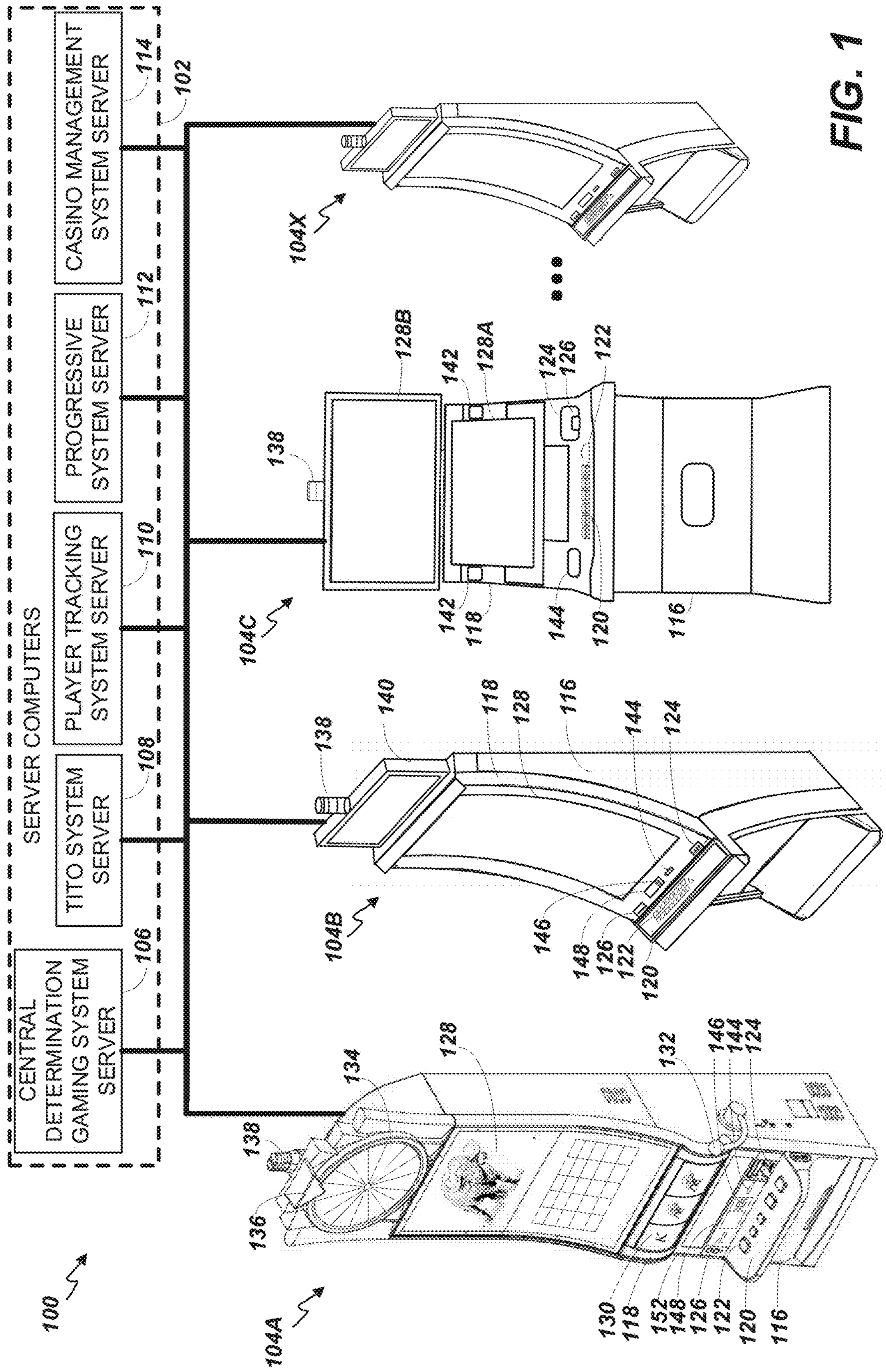
FIG. 1 is an exemplary diagram showing several EGMs networked with various gaming related servers.

Disclosed are examples removable covers for an electronic gaming machine (EGM). The disclosed EGMs have multiple external surfaces, each defined by a shape or size. The removable cover is shaped (e.g., cut, fitted, etc.) to correspond with the shape or size the external surfaces to provide graphics, patterns, colors, text, or a combination thereof. For example, the removable cover may be a multi-layer film for positioning over the external surfaces of the EGM, which may include a printable film (for printing of graphics, patterns, colors, text, etc.), and a flexible multi-layer film covering the printable film to provide additional protection for the printed layer and/or material. The multi-layer film is arranged to secure the flexible multi-layer film and the printable film to the external surface of the EGM, such as by use of an adhesive layer. The removable cover may be replaced, overlaid, and/or discarded to replace the material presented to a viewer of the removable cover and associated EGM.

Advantages offered by the use of coverings secured by an adhesive layer or film, including for example calendar and cast transit vinyl wraps, as opposed to panels affixed using semi-permanent fasteners (such as adhesive tapes) or using permanent fasteners (such as rivets or other permanent fastening means), is that the covering and the displays they provide may be changed easily, with a generally even adhesion and layering profile, without damage to the external surfaces of the underlying gaming machine. In this way it is possible to renew images, as for example when the cover becomes damaged or worn, and to change the covering in its entirety, such as when an advertising campaign ends and is replaced by another. To effect such changes, the old covering may, for example, be removed and replaced, or a new covering may be overlaid upon the existing covering. In some examples, one or more openings, vents, interfaces, handles, movable elements, or other features are left uncovered by a covering(s), so as to allow access and/or functionality of any such features.

In some examples, the covering may serve as a static display of advertising material or other information on one or more external surfaces of an EGM, either as a temporary or semi-permanent application. The covering may include a flexible multi-layer film or wrap (e.g., a vinyl material or other polymeric material), providing images, text, digital patterns, and/or other information, as well as providing environmental or other protections. For example, the multi-layer film may include a printable graphic layer, which may provide advertising images printed or otherwise provided on one side, and affixed to the one or more exterior surfaces of the EGM on the other side, such as by use of an adhesive and/or an adhesive layer provided on the external surface or on a side of the covering opposite the printed graphic. The systems and methods disclosed herein provide for a new and unique way to showcase products and attract attention to the gaming machine and/or gaming environment.

Disclosed coverings, films and/or wraps may be applied or attached to EGMs though various printing and/or transfer processes. The covering may be applied to the EGM using adhesive (e.g., a cold or hot adhesion processes), and/or may be adapted for flat attachment to one or more raised portions of the exterior surface, or may be fitted to fit the contours of the surface, such as by the use of heat shrinking film and/or processes. In an embodiment, the advertisement film is be pressed onto one or more external surfaces of the EGM using a pressing tool and/or technique. In some examples, the covering is taped, glued, or otherwise coupled to the one or more external surfaces of the EGM using an adhesive. In some examples, the covering encloses, bounds, or drapes the EGM. In an example, the advertisement film has a pressure sensitive adhesive and can be cold roll applied to one or more external surfaces of the EGM.

In some examples, the covering provides a layer of protection for the EGM. The covering may be configured to repel, degrade, and/or otherwise prevent contaminants from impacting the external surfaces of the EGM. Further, the covering may be configured for easy cleaning, disinfecting, sterilization, for instance, while protecting surfaces and/or components of the underlying EGM from damage and/or wear that may result from application of chemicals or other agents. These and other advantages are disclosed below with reference to the several figures.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
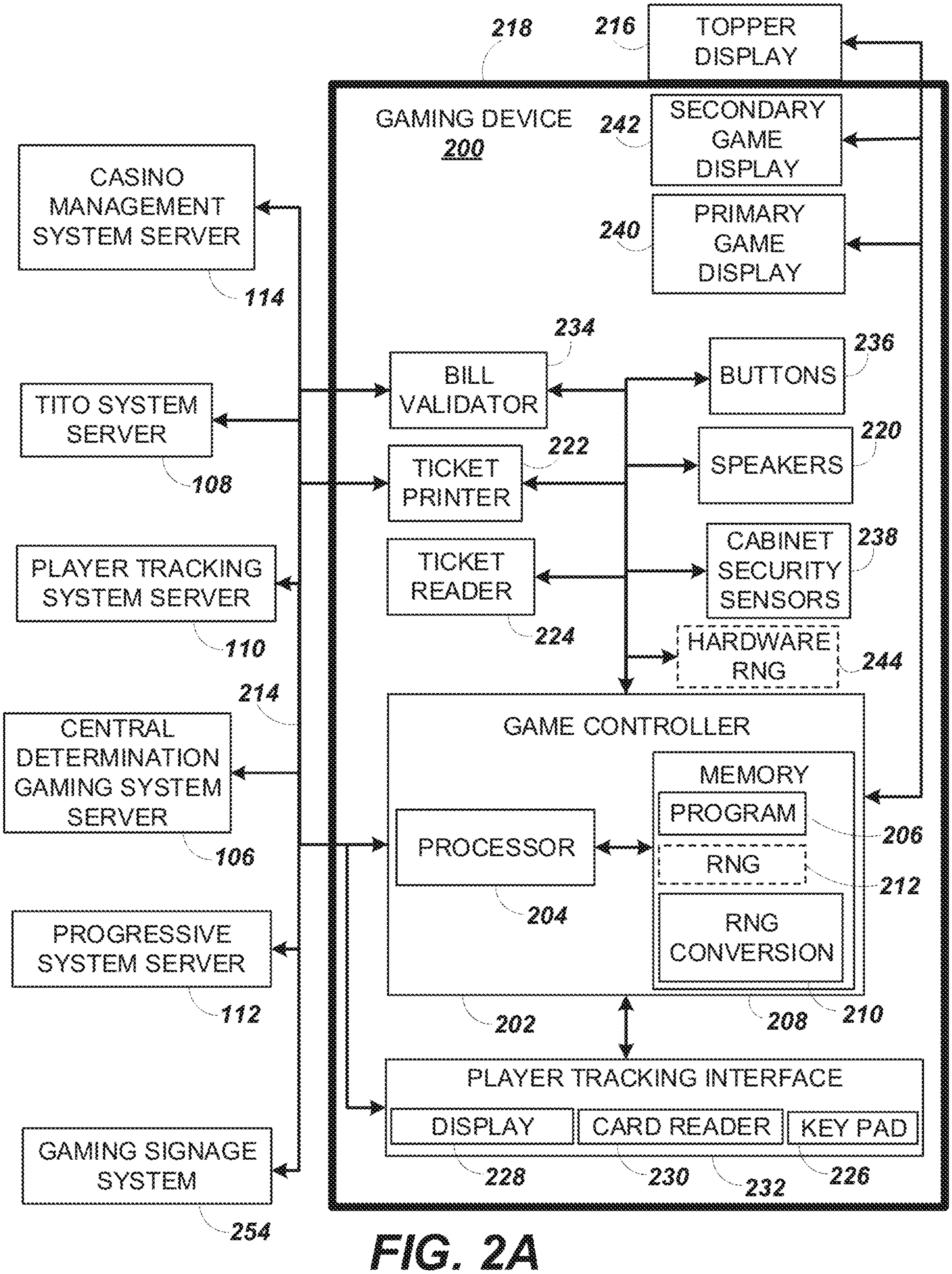
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
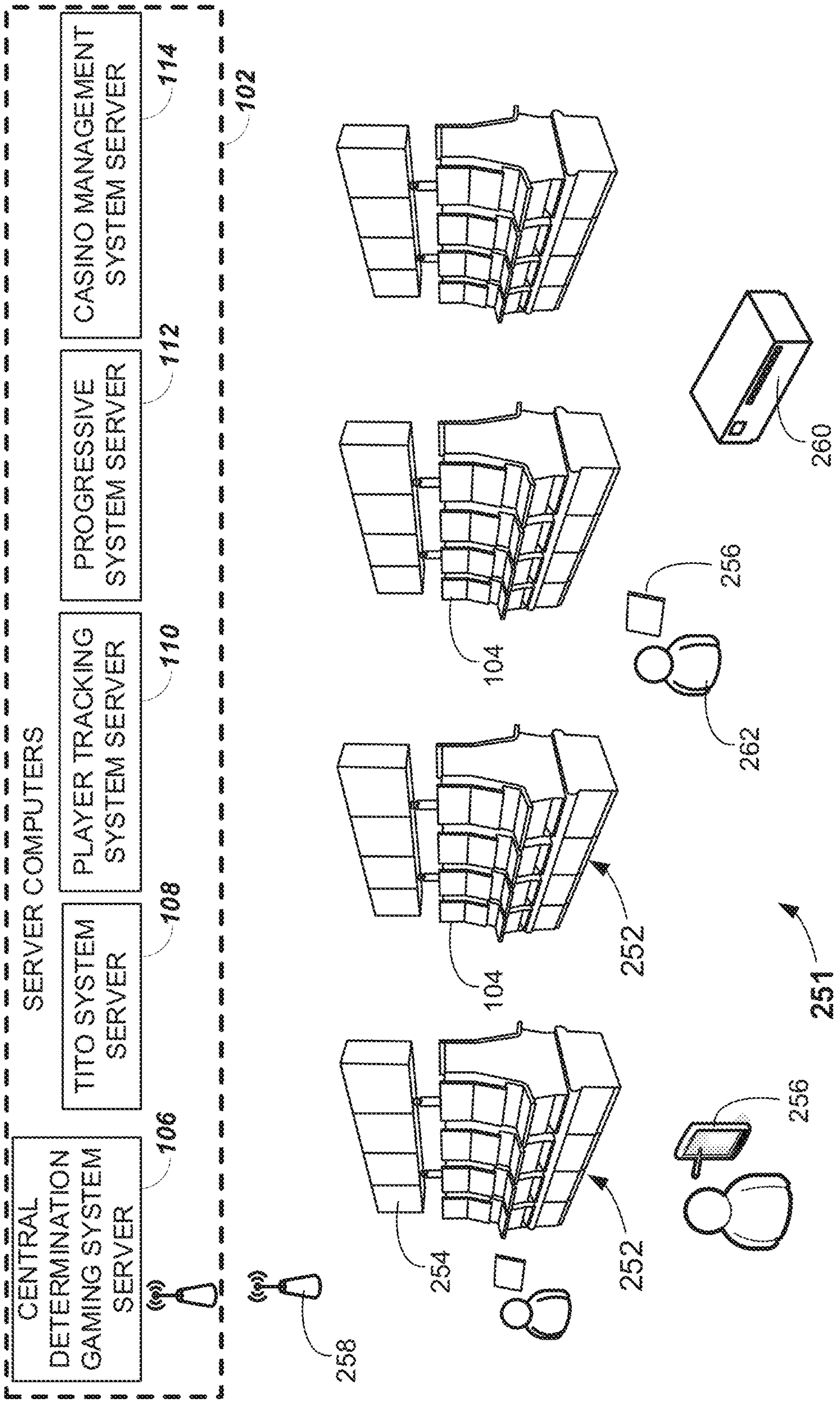
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
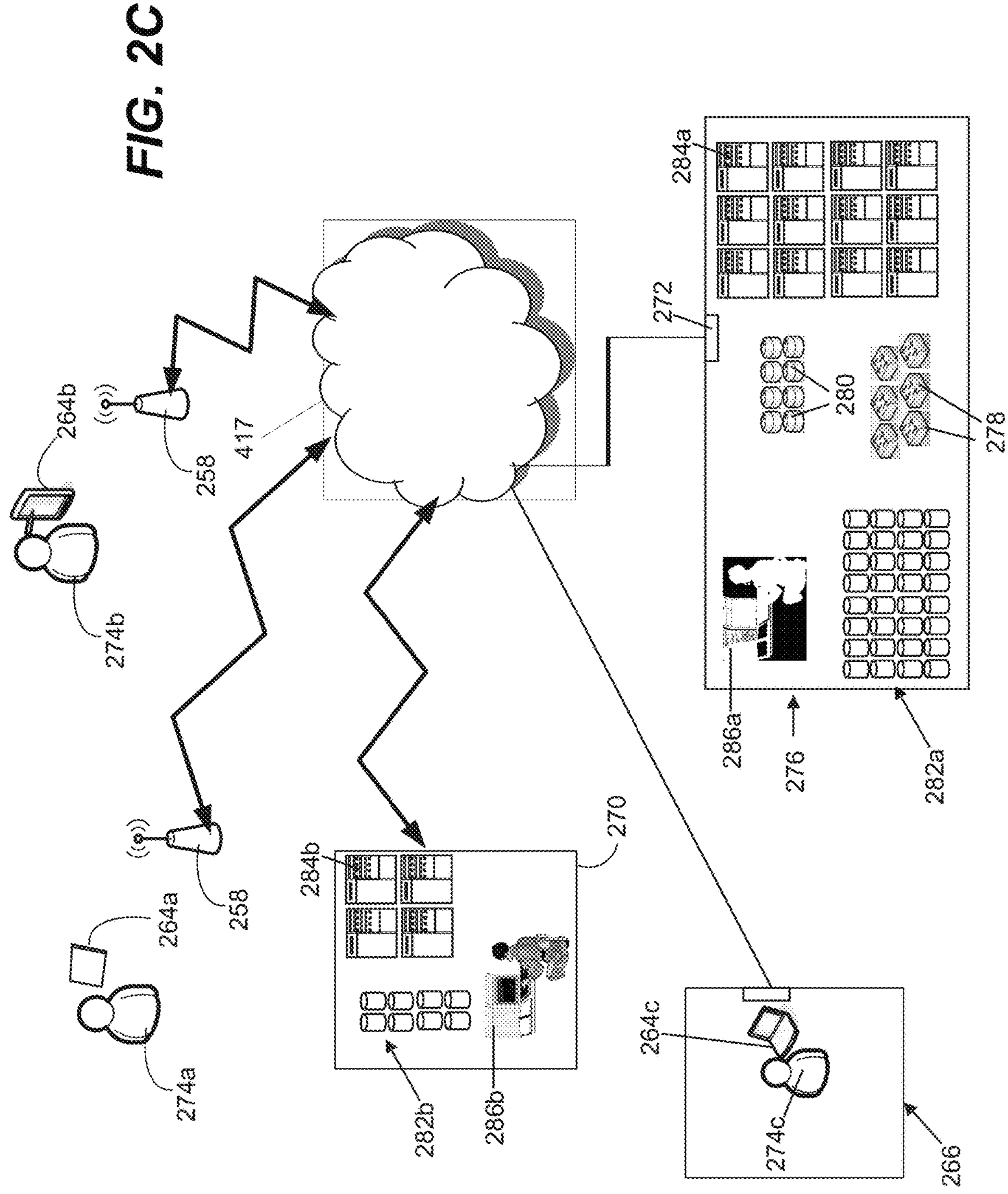
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers

284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
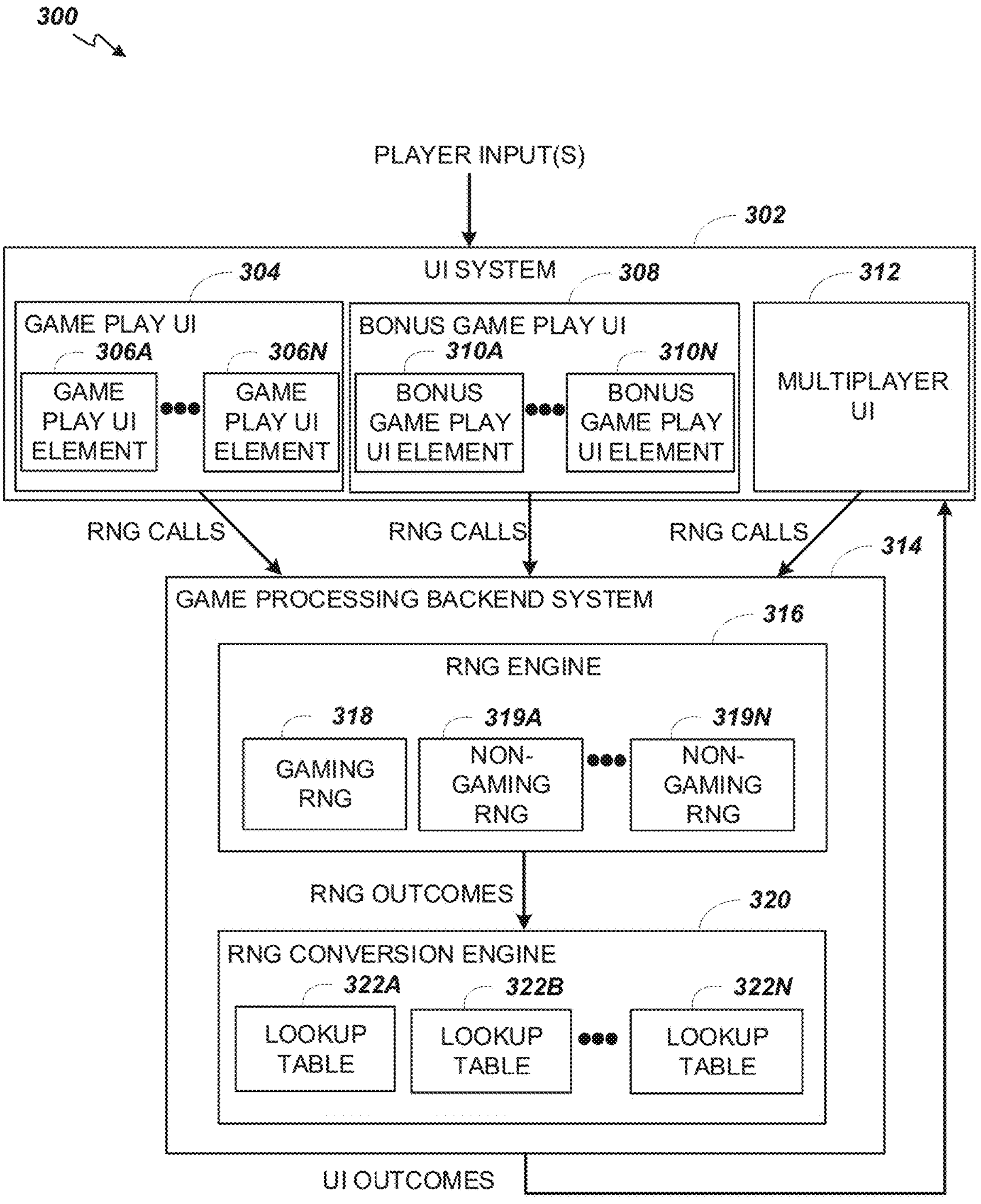
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
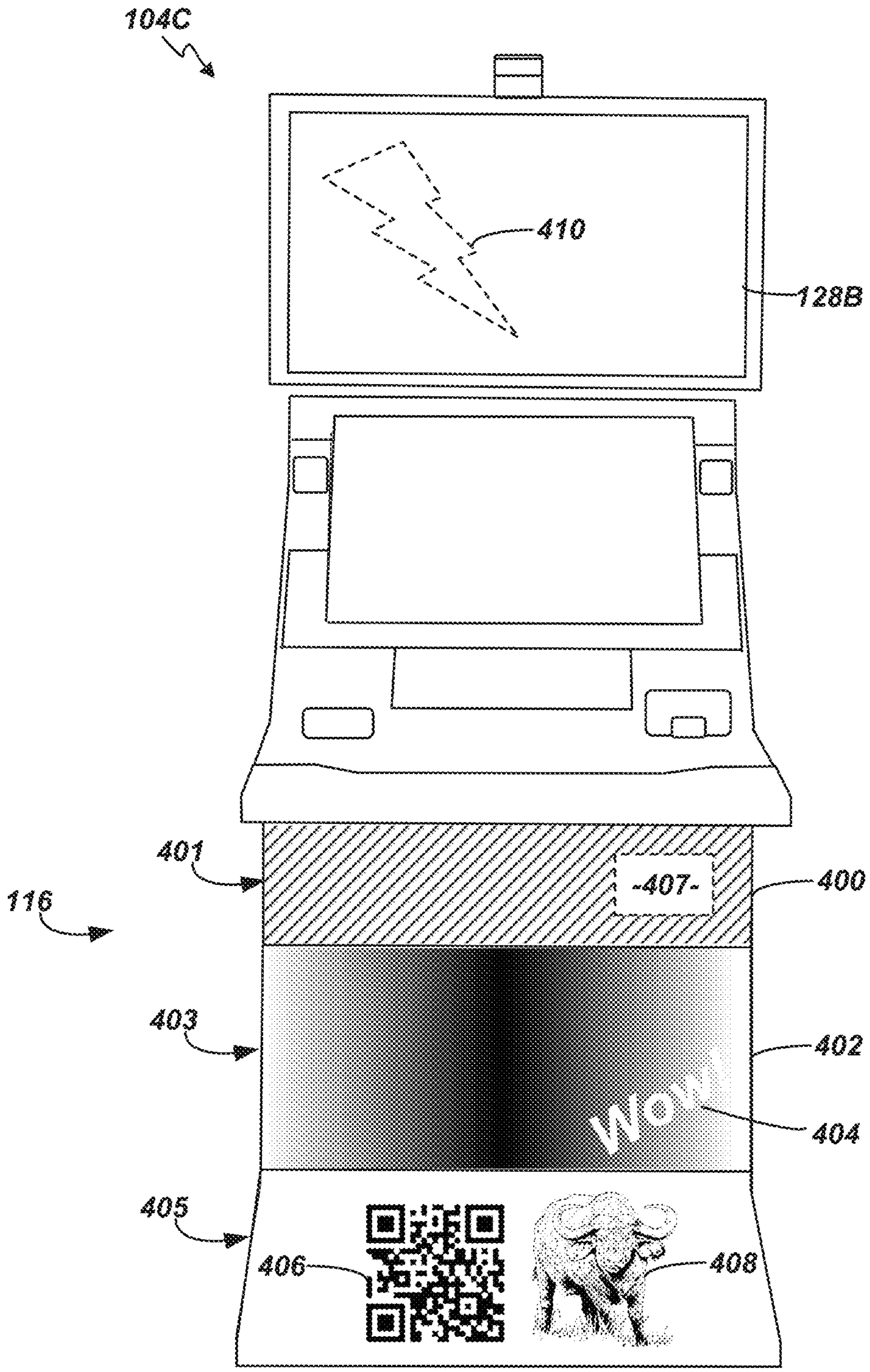
FIG. 4 is an exemplary diagram showing an EGMs according to some aspects of the present disclosure.

FIG. 4 shows an example of the electronic gaming machine (EGM) 104C with one or more coverings 400-410, as disclosed herein. As shown, the covering(s) may be a single covering or multiple coverings arranged on one or more external surfaces of the main cabinet 116 and/or the display 128B. The external surfaces of the main cabinet 116 may be constructed of one or more of a plastic, a metal, a wood, a laminate, a treated surface (e.g., powder coated), a faux finish, or a combination thereof, and may be flat, angled, rounded, or any conceivable geometry. The coverings 400-410 may wrap EGM wedges, spacers, dividers, or other signage (not shown). The material for coverings 400-410 may also be selected based on a variety of factors, including the characteristics of the external surfaces on which coverings 401-410 are to be applied, the type of adhesive used to attach the covering 401-410 to the external surfaces, and conditions that the coverings 401-410 will be subjected to (e.g., active casino floor patrons) or treated with (e.g., viral or bacterial disinfectants, detergents or other cleaning agents).

The covering(s) may be removable or semi-permanently secured to the EGM 104C. The coverings may be a flexible material and may be shaped to conform to the external geometry of the external surfaces of the main cabinet 116, including the cabinet and/or displays. For example, dimensions of the gaming machine 104C may be measured (e.g., via one or more sensors, digital models, computer programs, etc.) and modeled, such that each covering is cut or otherwise formed to wrap around one or more external surfaces of the gaming machine 104C while preserving a desired appearance of any printed material. The covering(s) may also be sized and shaped to accommodate EGM ventilation, other openings or access doors with little or no disruption of content displayed on the covering(s). The thickness of the covering(s) may vary, but will approximate a painted surface in appearance and will not affect the security features of the EGM.

The covering(s) may be secured to the external surfaces of the main cabinet 116 by application of an adhesive, tape, glue, heat shrinking, heating, stretching, sealing, a combination thereof, or any other suitable technique to secure the covering(s). The adhesive selected may depend on the conditions that the covering(s) may be exposed or subjected to. The covering(s) may be arranged around at least a portion of the external surfaces of the EGM 104C such that the covering is flush with the external surfaces of the EGM.

The covering(s) may impregnate or include various sensors and related hardware supporting the sensors that may sense, detect and/or communicate conditions involving, by way of example, tamper monitoring, enhanced game play features, status of the covering (e.g., damage or a tear), player vital signs, environmental conditions (e.g., temperature, presence of chemicals, particles, and/or contaminants in the environment, etc.), and EGM status (e.g., temperature of hardware components). Such sensors may be located in various positions or uniformly distributed throughout the covering. Depending on the sensors employed, additional security features may be included to secure the sensors from unauthorized access or from use of the data sensed. The sensors also may include the necessary circuitry to interact with EGM processors and game controls depending on the configuration (e.g., wired or wireless interfaces, communication protocols, etc.). Various interfaces may be employed to facilitate such interaction. For example, communication protocols configured to enable the EGM, system or mobile device may be used to communicate with various covering sensors and/or communication transport protocols (such as TCP/IP, USB, Firewire, IEEE1394, Bluetooth, IEEE 802.11x (IEEE 802.11 standards), HiperLAN/2, HomeRF, etc.) and/or configured to enable the EGM to communicate with covering sensors using such protocols. Also, communication may also be facilitated with the EGM itself, a casino system/server, or a mobile device using suitable protocols.

The covering(s) may include conductive material to create a circuit 407 (e.g., a membrane panel, a switch, etc.) to generate a signal in response to a trigger event. In some examples, the conduct material may include one or more traces or leads, in addition to the circuit 407, and may be printed on one or more layers of the multi-layer cover. For example, the conductive material may be a piezoelectric layer which generates the signal (e.g., transmitted to and readable by a control circuit of the EGM, such as game controller 202) in response to an input, such as a player contact. In some examples, the circuit 407 is identified by a graphic printed on the covering, and/or revealed in response to a change in the underlying system (e.g., activation of a light from a surface of an EGM). The circuit or switch can serve as a bonus or hidden feature, such that it is not revealed unless or until a predetermined goal is achieved during gameplay. Triggering the circuit 407 can then cause a response in the game. Advantageously, incorporating the circuit 407 in the covering allows the input to be located at any portion of the surface (e.g., on the EGM), the location of which can be changed with removal and replacement of the multi-layer covering. Further, circuits incorporated in the multi-layer film may be added easily to accommodate different games and/or campaigns, without the expense of modifying the underlying EGM.

The covering(s) may also include one or more characteristics and/or printed material, such as graphics, patterns, colors, text, or a combination thereof. In the example of FIG. 4, a first covering 400 with a first characteristic (shown with angled lines) is arranged at a first external surface 401 and a second covering 402 with a second characteristic (shown as a shaded gradient) is arranged at a second external surface 403.

In some examples, the covering(s) may include one or more indicia, such as text 404, graphics 408, and/or digitally readable images 406, as a list of non-limiting examples. Digitally readable images 406 could include QR codes, or barcodes that are printed on the covering(s). Such digitally readable images 406 would allow for additional player interaction with the EGM and/or a mobile phone, for example. The indicia may be visually perceptible at all angles, at a limited number of perspectives, may have a changed appearance from different angles, and/or based on a dynamic condition of the underlying surface. For example, a graphic 410 may be normally imperceptible to a player, yet if a particular wavelength and/or image is provided on display 128B, the graphic 410 may then become visible and/or have one or more characteristics change. In some examples, the information may provide instructions and/or tracking data corresponding to the particular gaming machine 104C and/or gaming environment.

In some examples, the covering(s) are arranged over a touchscreen panel, a keyboard, and/or a physical bash button, which may provide a particular visual presentation as well as providing physical protection. For example, the covering(s) are configured to enable touch control of an underlying touch sensitive interface.

All or a portion of the covering(s) may be removable and/or disposable, such that covering(s) may be removed, overlaid, and/or replaced in the gaming environment. Advantageously, the covering(s) may be segmented, such that some portions may be removed and/or replaced, while leaving other portions of the covering(s) intact. The covering(s) may be configured so that they may be removable on-site (e.g., a casino) with little or no disruption to EGM operation. Such covering(s) may advantageously permit EGM operators to change or offer different marketing opportunities, warnings, or gaming information during the operative life of the EGM(s). The covering(s) may be configured to display information across a bank of EGMs as opposed to a single EGM, or vice versa. As a result, a multi-layer film with a common characteristic and/or theme (e.g., color, advertising material, etc.) may be used to cover multiple objects, structures, or surfaces, allowing different EGMs, spacers, fixtures, seating, etc., to present a consistent image or campaign.

Further, the covering(s) may obscure or highlight features of the gaming machine 104C (e.g., an interface, a button, a card reader, etc.). Additionally, expensive finishes or surface treatments on the external surfaces of the cabinets may be avoided by application of the covering, which provides both ornamental indicia as well as substantial protection. It is also contemplated that a clear wrap for high wear areas (e.g., button panel) or cosmetic areas of the gaming machine may be employed, i.e. for surfaces of a high-end gaming machine that are gold plated. Such a wrap would also protect that surface from damage/wear, e.g., by the player. The covering can present a textured surface as well, which may provide information (e.g., braille) and/or provide a desired feel for the covered object (e.g., a wood grain pattern).

Figure 5:
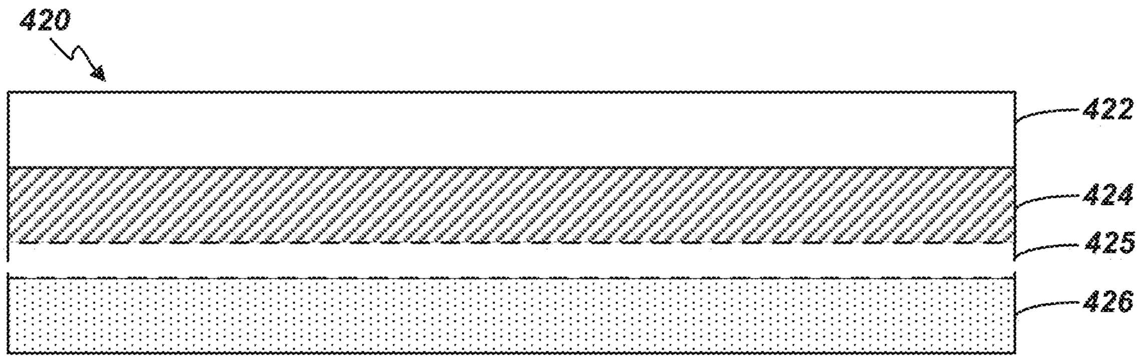
FIG. 5 is an exemplary diagram showing a multi-layer film for wrapping an EGM according to some aspects of the present disclosure.

FIG. 5 illustrates an example covering comprising a multi-layer film 420. As shown, the multi-layer film 420 may include a semi-transparent layer 422, a printable layer 424, and/or an adhesive layer 426. For example, the printable layer 424 is configured to receive the printed material, indicia, or other characteristic, while the semi-transparent layer 422 provides protection for the printable layer 424 and/or the gaming machine 104C.

The semi-transparent layer 422 may protect sensitive components of the electronic gaming system (e.g., circuits, interfaces, etc.) from environmental contaminants (e.g., moisture, smoke, etc.). Further, the semi-transparent layer 422 may comprise a material and/or treatment configured to degrade or otherwise reject contaminants. For example, silver or copper may be embedded in the semi-transparent layer 422, and/or applied as a surface treatment to prevent viral or other biological material from adhering to the film 420. The layer 422 may further protect the gaming machine 104C from applied cleansers (e.g., chemicals, disinfectants, ultraviolet radiation, etc.). One or more of the layers 422-424 may include a plastic material and/or a flexible vinyl material, such as a calendared vinyl or a cast vinyl material. Other materials, like various fabrics, may employed for the covering(s) depending on, for example, the location and characteristics of the EGM. Similarly, a textured wrap (e.g., a wrap having embossed or raised portions) may be employed depending on, for example, the location and characteristics of the EGM. In some examples, the textured portions provide information via raised and/or touch-sensitive indicators.

The semi-transparent layer 422 may be embossed. Such a layer 422 could have embossed logos, game titles, advertisements, graphics, textures, etc. For example, in the case of 3-D embossing, shapes or things under the surface of the layer 422 show through in some fashion, because of the conformability of the layer 422. Such an embossed effect may be seen and/or felt. Additional sub-layers can be added, e.g., to create various textures. An embossed layer 422 may add to player appeal and engagement, which can, in turn, increase operator profitability.

In some examples, an optional layer 425 may be included for printing or otherwise impregnating the multi-layer film 420 with conductive material. For instance, circuit 407 and/or associated traces may be printed on layer 425. In some examples, conductive material can be printed on another layer, such as printable layer 424, in addition to or in the absence of layer 425.

Figure 6:
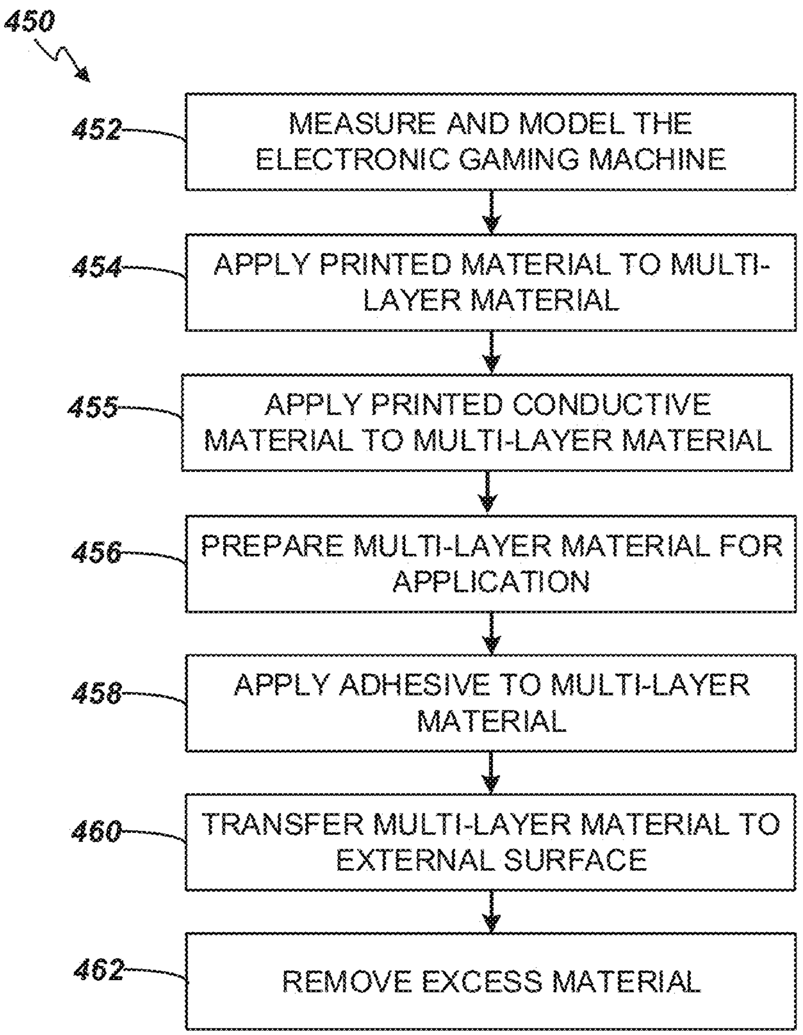
FIG. 6 is an exemplary method for applying a removable covering to an EGM according to some aspects of the present disclosure.

FIG. 6 provides a method 450 for applying a removable covering to an EGM, as disclosed herein. In block 452, a portion of the EGM is measured and modeled. In block 454, material is applied to a printed layer of a multi-layer vinyl material, the indicia arranged on the multi-layer material based on the model of the electric gaming machine. In optional block 455, conductive material is applied to a layer of the multi-layer vinyl material, the conductive material arranged on the multi-layer material to create a circuit or switch which may connect to a game controller. In block 456, the multi-layer vinyl material is prepared to conform to an external surface of the portion. In block 458, an adhesive layer is added between the layer of vinyl material and the EGM. In block 460, the multi-layer vinyl material is directly transferred to the external surface of the EGM (e.g., by heating, stretching, and/or sealing the multi-layer vinyl material). In block 462, any excess vinyl from the multi-layer vinyl material that is not transferred directly to the EGM is removed.

In some examples, one or more surfaces, such as of the EGM or signage, may receive the covering via a "hydro dipping" process. Hydro dipping is a printing process (hydrographic process) defined by immersing an object to be covered in a tank filled with fluid (e.g., water), resulting in the covering applied to the object. The hydro dipping process can be applied to a variety of materials (e.g., metal, plastic, glass, woods, etc.), as well as a variety of geometries.

Through the process, the covering, such as a printed, layered film, is transferred to the object. In examples, the layered film is water-soluble and configured to dissolve in the presence of a catalyst of activator solution. The surface tension of the fluid allows the layered film to follow the shape of the object, based on a shape of the covering. As a result, printed features (e.g., inks) adhere to the surfaces of the object, permanently or semi-permanently.

As the object is immersed in the fluid, the covering adheres to any surface exposed to the fluid. Complex geometries (e.g., bends, radii, curves, corners, etc.) are therefore easily covered by the hydro dipping process, providing coverage across the entire object without requiring predetermined cutting, shaping, etc., of the layered film prior to applying the film to the object. Hydro dipping can be employed to cover replaceable parts (e.g., of an EGM, a bar top collar, signage casing, etc.). Further, a system (such as an EGM or bank of EGMs) may include a collection of objects, with one or more objects covered by a first type of covering (e.g., a multi-layered film applied with an adhesive) and one or more objects covered by a second type of covering (e.g., hydro dipping).

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A removable cover for an electronic gaming machine having one or more external surfaces, comprising:

a flexible printable film for positioning over the external surfaces of the gaming cabinet of the electronic gaming machine, the flexible printable film comprising one or more integrated sensors printed on the flexible printable film and configured to detect one or more environmental conditions of the electronic gaming system;

a flexible multi-layer film covering the flexible printable film; and one or more circuits or switches connected to the one or more integrated sensors wherein the one or more circuits or switches comprise a bonus feature that is hidden until a predetermined goal is achieved during gameplay.

2. The removable cover of claim 1, wherein the multi-layer film further comprises an adhesive layer arranged to secure the flexible multi-layer film and flexible printable film to the external surface of the electronic gaming machine.

3. The removable cover of claim 1, wherein the removable cover is shaped to correspond with a shape of at least a portion of the external surface of the electronic gaming machine.

4. The removable cover of claim 1, wherein the flexible printable film is configured to be imprinted with one or more of graphics, patterns, colors, text, or a combination thereof.

5. The removable cover of claim 4, wherein the one or more of graphics, patterns, colors, text, or a combination thereof, is configured to dynamically change to display different information in response to a change in graphics or light effects on an underlying component of the electronic gaming machine.

6. The removable cover of claim 5, wherein the component is one of a light source or a digital display.

7. The removable cover of claim 1, wherein the flexible multi-layer film comprises a vinyl layer made of a calendared vinyl or a cast vinyl material.

8. The removable cover of claim 1, wherein the flexible printable film is made of a plastic material.

9. The removable cover of claim 1, wherein the removable cover comprises a semi-translucent layer.

10. The removable cover of claim 1, wherein the removable cover comprises a plurality of sections wherein each section is configured to be individually removable or to envelope one or more physically separate units.

11. The removable cover of claim 1, wherein the external surfaces is constructed of one or more of a plastic, a metal, a wood, a laminate, a coated surface, or a combination thereof.

12. The removable cover of claim 1, wherein the removable cover is subjected to heating, stretching, sealing, or a combination thereof to secure the removable cover to the external surfaces.

13. The removable cover of claim 1, wherein the flexible multi-layer film is removably arranged around at least a portion of the external surfaces of the electronic gaming machine such that the flexible multi-layer film is flush with the external surfaces of the electronic gaming machine.

14. The removable cover of claim 1, wherein the one or more integrated sensors are further operable to detect the one or more environmental conditions associated with the electronic gaming machine, the removable cover, or a combination thereof.

15. The removable cover of claim 14, further comprising one or more circuits or switches connected to the one or more integrated sensors to generate a signal in response to a trigger event and to communicate the signal or data corresponding to the one or more environmental conditions to a processor of the electronic gaming machine, a remote computing device, or a combination thereof.

16. The removable cover of claim 1, wherein the one or more environmental conditions of the electronic gaming system include tampering, enhanced game play features, a status of the covering, player vital signs, and a status of the electronic gaming machine.

17. A method of applying a removable and flexible covering to an electronic gaming machine, comprising:
- positioning a first cover comprising a flexible printable layer of vinyl material over a first surface of external surfaces of the electronic gaming machine, wherein one or more integrated sensors are printed on the flexible printable layer;
- performing a hydro dipping process on a flexible film;
- positioning the hydro dipped flexible film over a second surface of the external surfaces of the electronic gaming machine;
- providing one or more circuits or switches connected to the one or more integrated sensors wherein the one or more circuits or switches comprise a bonus feature that is hidden until a predetermined goal is achieved during gameplay; and
- removing the flexible printable layer of vinyl material hydro dipped flexible film.

18. The method of claim 17, further comprising laminating the flexible printable layer of vinyl material.

19. The method of claim 17, further comprising heating, stretching and sealing the flexible printable layer of vinyl material.

20. The method of claim 17, further comprising adding an adhesive layer between the flexible printable layer of vinyl material and the electronic gaming machine.

21. A removable cover for an electronic gaming machine housed in a gaming cabinet having one or more external surfaces, comprising:
- a flexible printable film for positioning over the external surfaces of the electronic gaming machine, wherein the external surfaces is defined by a geometry that include two or more of a flat surface, an angled surface, and a rounded surface, the flexible printable film shaped to conform to the geometry of the external surfaces;
- a flexible vinyl film covering the flexible printable film; and
- a circuit comprising one or more conductive traces printed on the flexible printable film and configured to provide a signal in response to a trigger event,
- wherein the circuit further comprises a bonus feature that is hidden until a predetermined goal is achieved during gameplay.

22. The removable cover of claim 21, wherein the trigger event is a user input.

23. The removable cover of claim 21, wherein the circuit includes a piezoelectric switch.

* * * * *